United States Patent [19]

Maréchal et al.

[11] 3,924,952

[45] Dec. 9, 1975

[54] ARRANGEMENT AND METHOD FOR STUDYING RADIATION BY INTERFERENTIAL SPECTROMETRY

[75] Inventors: Robert Gaston André Maréchal, Orsay; Gerard Fortunato, Cachan, both of France

[73] Assignee: Etablissement Public Agence Nationale de Valorisation de la Recherche (ANVAR)., Neuilly-sur-Seine, France

[22] Filed: Feb. 6, 1974

[21] Appl. No.: 440,142

[30] Foreign Application Priority Data

Feb. 6, 1973  France .............................. 73.04040

[52] U.S. Cl.............................. 356/106 S; 356/71
[51] Int. Cl.$^2$........................................... G01B 9/02
[58] Field of Search ........ 356/106 R, 106 S, 74, 71; 250/237

[56] References Cited
UNITED STATES PATENTS
3,836,254   9/1974   Barringer......................... 356/106 S

*Primary Examiner*—Alfred E. Smith
*Assistant Examiner*—Conrad J. Clark
*Attorney, Agent, or Firm*—Baldwin, Wight & Brown

[57] ABSTRACT

An arrangement and a method for studying radiation by interferential spectrometry. The arrangement includes, starting from a light source, an interferometer-splitter for dividing the source into two beams the interferometer being preferably a Sagnac interferometer, a lens objective, a displaceable grating and means for observing and processing the resultant flux, and at least one reference screen and one grating juxtaposed in the focal plane of the lens, and in which the difference between the out-going fluxes is measured. Preferably at least one reference screen and one grating are juxtaposed in the focal plane of the lens. Signals are received, transformed into current, from each grating. The difference between the two currents is determined for obtaining a result proportional to the integral of correlation $\int i(\Delta) i_R(\Delta) d\Delta$. This system is particularly useful in the study of radiation having a very rapid temporal evolution.

15 Claims, 4 Drawing Figures

ARRANGEMENT AND METHOD FOR STUDYING RADIATION BY INTERFERENTIAL SPECTROMETRY

The present invention relates to an arrangement and a method of studying radiation by interferential spectrometry, by means of the spatial display of the Fourier transformation of a spectral luminance by an interferometer of optimum brightness or luminosity and resolution, i.e., an interferometer with cross translational splitting, and, the spectral analysis, by correlation with a reference radiation, of radiation having a very rapid time variation (temporal evolution); further by means of the correlation of derivatives of any degree of two spectra; finally, by means of the direct analysis of a spectrum, all properties of which make this method particularly adapted to effectuating analysis and measurement. For the interferometer with transverse splitting, a Sagnac interferometer is preferably employed.

For studying the make up and composition of certain bodies and substances, it has already been proposed to compare the light spectrum that they emit with that of a reference body or substance. There are known, inter alia, methods of interferential spectrometry with selective modulation comprising, starting from a light source, an interferometer-splitter and objective lens, a displaceable grating with selective modulation as well as means for observing and processing the resultant light flux (see the works of Prat and of Barringer). Such arrangements are known, in particular, in which the final viewed image is received directly in a plane independent of the value of the splitting. The grating may be formed by two correlating masks inverted relative to each other and driven in suitable cyclical movement.

In the case of FIG. 1 of the accompanying drawings which schematically illustrates such a known device, a light source S is split by a splitter interferometer D and gives rise to two images S1 and S2 which are deductible relatively by transverse translation; these two images (sources) are therefore coherent and correspond point by point; a lens O is disposed at the exit of the interferometer in the focal plane of which the intereference phenomenon is observed. If $y$ is the distance from the viewing point to the axis, the difference $\Delta$ in the path of the vibrations (in French "difference de marche") which interference is expressed by $\Delta = ay/f_o$ where $a$ is the distance between the two sources S1 and S2 and $f_o$ is the focal length of the objective (lens); if we take $\sigma = 1/\lambda$, we obtain in the focal plane of the objective O a degree of illumination which may be expressed by means of the spectral distribution of the energy $S(\sigma)$ from the source, by the formula:

$I(\Delta) = \int S(\sigma) \cos^2 \pi\sigma\Delta d\sigma = \frac{1}{2} \int S(\sigma)d\sigma + \frac{1}{2} \int S(\sigma)\cos 2\pi\Delta\sigma d\sigma;$ $I(\Delta)$ may be put in the form:
$I(\Delta) = I_o + i(\Delta)$
by taking:
$I_o = \frac{1}{2} \int S(\sigma) d\sigma$ and $i(\Delta) = \frac{1}{2} \int S(\sigma) \cos 2\pi\Delta\sigma d\sigma;$ We find that we have in $i(\Delta)$ the variable part of the interferogram $I(\Delta)$, of the Fourier transformation of the spectrum $S(\sigma)$, to be analyzed.

It is further known that the operations such as derivation, correlation (commonly known as "comparison"), multiplication, etc . . . may be obtained by way of Fourier transformation by applying classical rules of mathematics.

It is also known that, in order to compare an emission (or absorption) spectrum $S(\sigma)$ with a reference spectrum $S_R(\sigma)$, the correlation may be made (which is expressed by $S_R(\sigma) \otimes S(\sigma)$). To this end, it is simply necessary to determine the product of the Fourier transformation $i(\Delta)$ of $S(\sigma)$ by $i_R(\Delta)$ of $S_R(\sigma)$ and determine the Fourier transformation of the product $i_R(\Delta) \cdot i(\Delta)$. As it is of particular interest to determine the center of the function of correlation, i.e., $\int i_R(\Delta) \cdot i(\Delta)d\Delta$ and as we have $I(\Delta)$ in the focal plane of the objective O, we got the idea to place in this plane a transparency proportional to $I_R(\Delta)$.

With respect to obtaining interferograms, if one operates in a range in which photography is possible, one can photograph the reference interferogram $I_R(\Delta)$ in order to use this photograph or record in place of the grating of the interferential spectrometer.

When photography is not possible, the reference interferogram may be constructed by various means. This may be carried out, for example, a. by calculation for example, by Fourier transformation starting, with the interferogram obtained on a spectrometer, b. by optical simulation by using visible monochromatic light: indeed, since a wavelength $\lambda$ corresponds to a grating in which the grating spacing $$p = \frac{\lambda_o}{a_o},$$

it suffices, if there are $q$ emissions or absorptions of wavelengths $\lambda_1; \lambda_2 \ldots \lambda_q$, to successively record the interference corresponding to the wavelengths $\lambda'_1, \lambda'_2, \ldots \lambda'_q$ such that $$a_1 \frac{\lambda_1}{\lambda'_1} = a_2 \frac{\lambda_2}{\lambda'_2} = a_q \frac{\lambda_q}{\lambda'_q}.$$

By studying these phenomena and calculations, we have noted that: once the interferogram $I_R(\Delta)$ is in place, if radiation to be analyzed is emitted, the receiver R receives a flux proportional to
$\int (I_o + i_R(\Delta))(I + i(\Delta)) d\Delta;$ that the mean value of $i_R(\Delta)$ and the mean value of $i(\Delta)$ being zero, this integral is equal to $\int I_o I \, d\Delta + \int i_R(\Delta) i(\Delta) d\Delta;$ and that, in this addition, only the second integral is of interest for indicating to the operator the existing correlation between $S(\sigma)$ and $S_R(\sigma)$.

From this we concluded that this term should therefore be separated from the first term $\int I_o \cdot I d\Delta$ which could be obtained by modulation methods or by static differential methods. It then appeared to us that static differential methods which did not need any modulation would be preferable, namely in cases of analysis of radiation having a very rapid variation with time (temporal evolution).

An object of the invention consists in the juxtaposition of two complementary gratings (reference interferograms) in the focal plane of the objective lens, for example vertically if the fringes are vertical, one of the gratings being positive and the other negative, their respective transparencies being expressed by $I_o + i_R(\Delta)$ and $I_o - i_R(\Delta)$, $I_o$ being the mean transparency and $i_R$ the variable transparency of the interferogram, the signals from each grating transformed into current being received separately, and the difference between the two currents being determined to obtain a result proportional to the integral of correlation:
$\int i(\Delta) \cdot i_R(\Delta) d\Delta.$ It is also possible to replace one of the gratings by a uniform transparency adjusted to the mean value $I_o$, thereby avoiding the manufacture of a negative (grating) but half of the signal is lost. This arrangement could also be very advantageous for the simultaneous detection of three components 1,2,3, etc. of a mixture. The plane of the interferogram can be, in effect, divided into horizontal bands, if the fringes are vertical, provided with reference interferograms $I_R$, $I_R$, $I_R$, etc., and a neutral band $I_o$. The concentration of the components 1,2,3, etc . . . may then be ascertained from currents corresponding to $I_R - I_o$, $I_R - I_o$, $I_R - I_o$, etc.

In arrangements of this type, the interferometer, the objective (lens) and the grating are all fixed, which provides a great reliability in operation, assembly and use.

Figure 2:
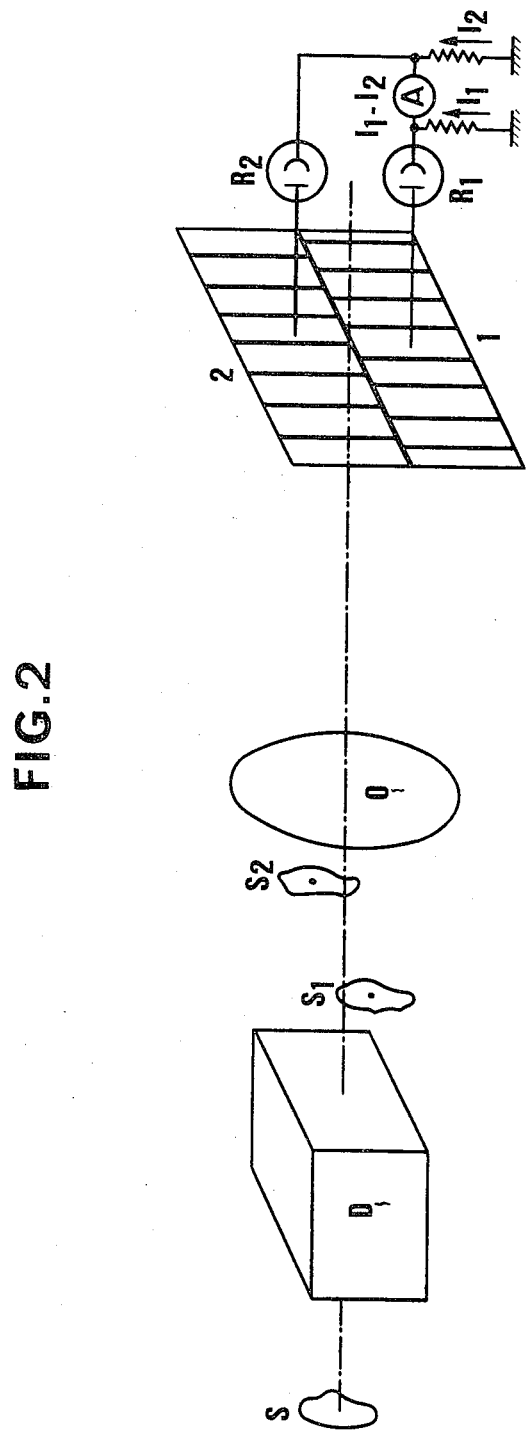
FIG. 2 is an arrangement for carrying out the method according to the invention.

An arrangement for carrying out the method according to the invention is illustrated in FIG. 2 which is a schematic view in perspective showing a light source S, a interferometer D which is preferably a Sagnac interferometer. The images $S_1$ and $S_2$, the lens O, the complementary interferogram grating(s) 1 (and 2) each connected to a receiver $R_1$ (and $R_2$) and a display device A showing a value $I_1 - I_2$ of the difference of the currents coming from $R_1$ and $R_2$.

The arrangement according to the invention could also be used to study radiation with a not too great temporal evolution, in which case it is possible to use:

either two of the aforesaid complementary gratings, alternately occulting or blacking out the two gratings and receiving the light flux which passes through them in a single receiver and effect a synchronous detection at the occulting or black out frequency of the gratings of the current provided by the receiver; or a single grating and a single receiver, effecting a relative displacement of $I(\Delta)$ with respect to $I_R(\Delta)$ of a fraction of the average distance between the interference fringes (average interfringe spacing) or of a great number of the interfringe spacings: this displacement therefore modulating $\int i(\Delta) i_R(\Delta) d\Delta$ with respect to $\int I_R.I_o \, d\Delta$.

Finally, irrespective of the temporal evolution of the radiation to analyze and therefore the method of isolation (or separation) of the integral of correlation $\int i(\Delta) i_R \Delta \, d\Delta$ from the integral $\int I \cdot I_r \cdot d_r^\Delta$ the method according to the invention gives the possibility of providing the correlation of the derivatives of the spectra. Indeed, the Fourier transformation of the derivative $S'(\sigma)$ of $S(\sigma)$ is proportional to $\Delta I(\Delta)$, therefore the Fourier transformation of $S'(\sigma) \oplus S'_R(\sigma)$ will be $\Delta^2 I(\Delta) \cdot I_R(\Delta)$. In order to bring about this correlation of derivatives, it is simply necessary to interpose a filter, whose energy transparency varies as $\Delta^2$, in the plane of the interferograms. This filter may also be formed by simply placing a mask, the outline of which varies as $\Delta^2$, against the grating. This possibility of correlating the derivatives of the spectra rather than the spectra themselves diminishes the probability of erroneous detections. In effect, the correlation of two band spectra having a common portion always gives a signal whereas the correlation of derivatives gives a signal only if the sides of the bands coincide.

In view of the above, the arrangements according to the invention also permit to obtain not only $S(\sigma)$ but also $S^{(n)}(\sigma)$ (derivative of the $n^{th}$ degree of $S(\sigma)$ ) by placing in the plane of the grating a transparency mask or an outline mask according to the function $\Delta^n$; it also offers the possibility of obtaining not only the correlation of $S(\sigma)$ and $S_R(.\sigma)$ and the correlation of $S'(\sigma)$ and $S'_R(\sigma)$, but also the correlation of the derivative of the $n$th degree of $S(\sigma)$ with the derivative of the $p$th degree of $S_R(\sigma)$, $n$ and $p$ being positive integers or zero. Thus, it suffices to place in the plane of the grating a transparency mask or a transparency outline conforming to the function $\Delta^{(n+p)}$.

Another application of the invention corresponds to the case, in which a source having $i(\Delta) + I_o$ as interferogram, is desired directly without calculating the spectrum $S(\sigma)$: $i(\Delta)$ could be separated from $I_o$ by modulation methods or by differential methods and a harmonic analysis made thereof. For this purpose, according to a further feature of the invention, it is possible to merely replace the grating showing the reference interferogram by a periodic grating which therefore shows the interferogram of a monochromatic light source, and then use:

1. two gratings one positive and one negative followed by two receivers, determining the difference in the currents of the receivers with a view to essentially studying the spectra of a source having a rapid temporal evolution or, 2. two alternately masked gratings and a single receiver; or 3. a single grating and a single receiver by imposing a relative movement of the grating with respect to the fringes produced by the interferometer.

Figure 1:
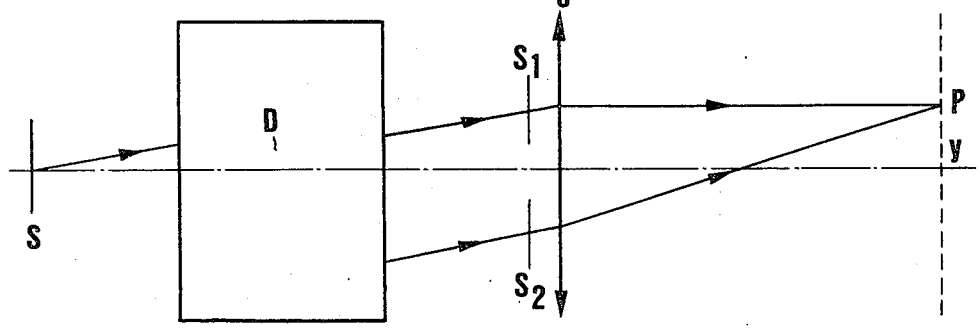
FIG. 1, mentioned previously, is a schematic illustration of a known device for studying radiation by interferential spectrometry.

In these three cases, where modulation is brought into play, it is possible within the scope of the invention to find out one after another the components of the spectrum $S(\sigma)$ or one of their derivatives by varying the distance between $S_1$ and $S_2$ (FIG. 1).

Figure 3:
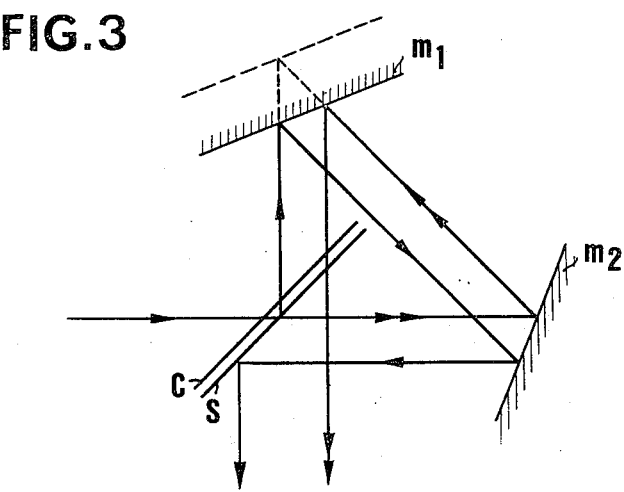
FIG. 3 illustrates the operation of the Sagnac interferometer.

The interferometer, one of the essential parts of the arrangement, may be any optimum splitter i.e. such an interferometer with two waves which produces from a single source two images which result from transverse translation. Presently, the Sagnac interferometer (see FIG. 3) has the following particular advantages:

a. its brightness or luminosity which is very much greater than that of the equivalent to a compensated Michelson interferometer, for example, but of a much simpler construction. This luminosity is substantially optimum at an angle of 90° (FIG. 3).

b. its simplicity of construction: a separator system, compensator, and two plane mirrors;

c. its not being disturbed by maladjustments and various vibrations and perturbations: the two beams strike the same optical elements and thereby the fabrication tolerances of the optical elements are less strict. Moreover, very delicate mechanical connections, such as in more complicated assemblies, are not needed;

d. the possibility of simply varying the duplication of the beams by translation of one of the mirrors, even starting from O; and e. the possibility of displaying the interferogram in the focal plane of a lens (objective) for analysis and correlation and making use of the possibilities of Fourier transformations.

The duplicators referred to, particularly the Sagnac interferometer, therefore appear to provide an extremely simple way of producing a very bright interferogram. There are numerous possible uses of this interferogram:

1. for directly carrying out a harmonic analysis with a movable grating (functioning as an interferential spectrometer with selective modulation).

2. for modifying this interferogram by means of a screen of variable transparency which enables, in particular, the first or $n$th derivative of the spectrum to be obtained.

3. by the same method, for correlating the derivative of the spectrum with the derivative of the reference spectrum which is more sure that correlating the spectra themselves with one another as has been the case up to now.

4. for projecting the interferogram on two fixed gratings periodically shifted a half cycle and placed in front of two receivers, whereby the difference between the currents in the two receivers is measured. This assembly enables the study of very rapid variations of emission or absorption.

5. by periodically replacing the gratings with fixed interferograms which enable one to ascertain as a function of time the correlation of anemission, which varies rapidly, with a reference spectrum or with its derivative.

Figure 4:
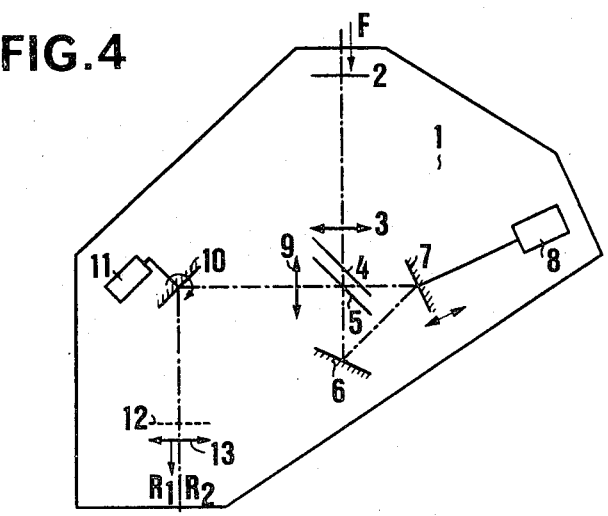
FIG. 4 illustrates a practical optical assembly for carrying out the method according to the invention.

FIG. 4 schematically illustrates a practical optical assembly or arrangement for carrying out the method according to the invention. A support 2 for a diaphragm is mounted on a carriage 1, the light comes from a source (not shown) from the direction of the arrow F.

The diaphragm is followed successively by a condenser 3 perpendicular to the axis of the beam, a compensating plate 4, a separating plate 5 (this separating plate is a glass plate coated on one face with an aluminum film), a Sagnac interferometer comprising a first fixed mirror 6, a second mirror 7 displaceable by means of a motor 8, a lens (objective) 9, a mirror 10 (which may be oscillated by means of a piezo-crystal 11 in case it is desired to operate with modulation), which is followed successively by an interferogram support 12 and a condenser 13, the final beam leaving the condenser 13 being received by at least one receiver (not shown).

What is claimed is:

1. An arrangement for studying the spectrum of a source, which comprises:
   interferometer means for receiving light from said source and splitting it into two laterally spaced images having substantially equal intensities;
   lens means for focusing light from said two images to provide a luminous interference pattern in the back focal plane of said lens means, which pattern is an exact, high contrast Fourier transform of the spectrum of said source obtained for positive and negative values of the optical path difference existing by virtue of the lateral spacing of said images; and
   modifying means located at said back focal plane for operating on said Fourier transform to analyze said pattern and obtain information about the spectrum of said source.

2. An arrangement as defined in claim 1 wherein said modifying means is an interferogram in the form of the Fourier transform of the spectrum of a reference source.

3. An arrangement as defined in claim 1 wherein said modifying means includes a mask having an energy transparency which varies according to the $n^{th}$ power of said optical path difference whereby to obtain the $n^{th}$ derivative of said spectrum.

4. An arrangement as defined in claim 2 wherein said modifying means also includes a mask having an energy transparency which varies according to the $(n + p)^{th}$ power of said optical path difference whereby to obtain comparison between the $n^{th}$ derivative of the spectrum of said source with the $p^{th}$ derivative of the spectrum of said reference source.

5. An arrangement as defined in claim 1 wherein said modifying means includes a pair of complementary gratings, one positive and one negative, juxtaposed in said back focal plane, and a pair of receiver means, one for each complementary grating, for receiving signals respectively from said positive and said negative complementary gratings whereby information about the spectrum of said source is obtained.

6. An arrangement as defined in claim 5 for use in studying the spectrum of radiation having a rapid temporal evolution, said modifying means including a periodic grating showing the interferogram of a monochromatic source.

7. An arrangement as defined in claim 2 for use when the temporal evolution of the radiation being studied is not very rapid wherein said modifying means includes a single grating showing the interferogram of a monochromatic source, and means for effecting relative movement between single grating and the fringes of said luminous interference pattern.

8. System according to claim 1, wherein the interferometer means is a Sagnac interferometer.

9. The method of analyzing the spectrum of a source which comprises the steps of:
   a. forming laterally spaced point-by-point coherent images of a source, said images having substantially equal intensities;
   b. focusing light coming from said images in a selected plane to produce an interference pattern which is the Fourier transform of the spectrum of said source; and
   c. operating on said Fourier transform to analyze the spectrum of said source.

10. The method according to claim 9 wherein the operation of step (c) is multiplication of said Fourier transform by the $n^{th}$ power of the path difference which produces the interference pattern.

11. The method according to claim 9 wherein the operation of step (c) is correlation of a derivative of the spectrum of said source with a derivative of the spectrum of a reference source.

12. The method according to claim 9 for use when the temporal evolution of the spectrum is not very rapid, wherein the operation of step (c) includes: providing, in said selected plane, two complementary gratings, one positive and one negative; and alterately occulting said two complementary gratings at a predetermined frequency.

13. The method according to claim 9 for when the temporal evolution of the spectrum is not very rapid, wherein the operation of step (c) includes: providing, in said selected plane, a single grating; and displacing said single grating a distance equal to a fraction of the average interfringe spacing of said interference pattern.

14. The method according to claim 9 for use when the temporal evolution of the spectrum is not very rapid, wherein the operation of step (c) includes: providing, in said selected plane, a single grating; and displacing said single grating a distance equal to a multiple of the average interfringe spacing of said interference pattern.

15. The method according to claim 9 wherein the operation of step (c) is correlation of said Fourier transform with the Fourier transform of the spectrum of a reference source.

* * * * *